Patented Aug. 16, 1949

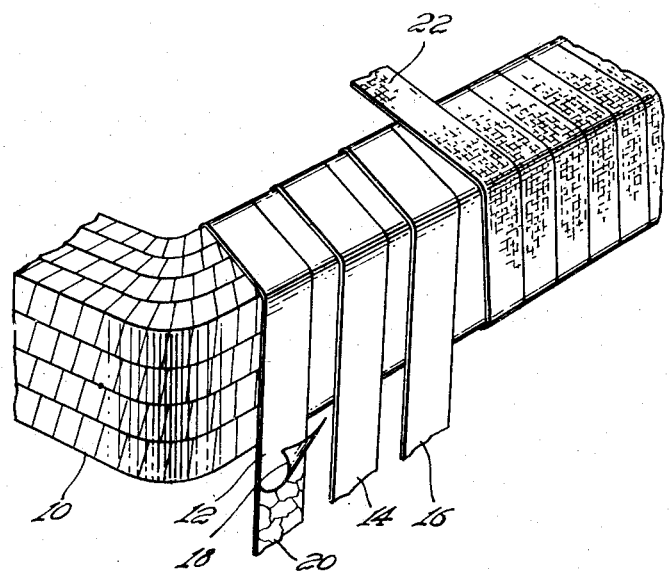

2,479,357

UNITED STATES PATENT OFFICE 2,479,357

METHOD OF MAKING ELECTRICAL INSULATIONS

Lawrence R. Hill, Ernest Bindschadler, and John A. Campbell, Pittsburgh, Pa., assignors to Westinghouse Electric Corporation, East Pittsburgh, Pa., a corporation of Pennsylvania Application January 10, 1945, Serial No. 572,150

5 Claims. (Cl. 154—80)

This invention relates to electrical insulation and the method of preparing the same, and more particularly to electrical coils prepared from composite insulation.

In order to secure high efficiency and high insulation quality in electrical coils, it has been customary to apply to the assembled turns of a conductor forming a coil a wrapping of composite insulation composed of a fibrous sheet carrying mica flakes united with a resinous binder. The composite mica insulation is wrapped about the assembled turns of the coil to a predetermined thickness in order to provide satisfactory coil-to-ground insulation.

Further, to assure the optimum electrical insulation possible, coils wrapped with the composite insulation are impregnated with an insulating varnish. The impregnating varnish is applied to the coil by a treatment in which the complete coil is generally first subjected to a vacuum treatment to remove moisture, gases and other deleterious volatile material from the coil and the varnish is then applied, often under pressure, in order to assure penetration to the innermost interstices of the coil. Subsequently, the varnish impregnated coil is heat treated by baking in order to remove the volatile solvent and to polymerize the resin in the varnish.

Coils made according to the above procedure even under the most carefully supervised procedure, with as much as four successive varnish treatments, have been found to be incompletely impregnated with the insulating resin. Electrical power factor tests with increasing voltage indicate a steady increase in power factor. If the coil were solidly impregnated with resin, the change in power factor with change in voltage would be quite small.

Several reasons have been found to account for the incomplete impregnation. The volatile solvent present in the insulating varnish applied to a coil leaves voids when it is driven off during the heat treatment. Attempts to fill the voids by two, three or more repetitions of the varnish impregnation do not appear to give total impregnation.

Furthermore, even the application of a solventless or completely polymerizable varnish material does not greatly improve the coil insulation. Tests have shown that the binder uniting the mica flakes and the fiber sheet backing in the composite insulation wrapped on the coil functions to greatly hinder the penetration of any varnish impregnant. It is quite unexpected that the binder in the composite insulation exerts so important a restraining action on the varnish penetration. Comparative experiments using composite tapes with and without resinous binder indicate that the major proportion of the difficulty encountered in varnish impregnation of coil may be traced to the presence of such resinous binder in the composite insulation present on the outside of coils.

The object of this invention is to provide for substantially completely impregnating with a resinous material a member carrying composite mica insulation.

An object of this invention is to provide a composite tape of mica and a fibrous sheet backing united with a volatile binder.

A further object of the invention is to provide a coil with a wrapping of composite mica insulation without a resinous binder whereby to promote more complete subsequent impregnation of the member.

A still further object of the invention is to provide a process for building coils substantially completely impregnated with a resin and having a substantially constant power factor with a change in voltage and capable of use at high voltages without adverse corona and other effects.

Other objects of the invention will in part be obvious and will in part appear hereinafter. For a fuller understanding of the nature and objects of the invention, reference should be had to the single figure of the drawing showing a fragmentary view in perspective of a coil constructed according to the invention.

According to the present invention, composite insulation composed of mica flakes combined with a sheet fibrous backing, such, for example, as paper, cambric, glass fiber cloth, asbestos cloth and the like is so prepared, applied to coils and treated that no resinous binder is present therein immediately preceding the step of impregnating coils with a varnish. Composite insulation so prepared enables the successful manufacture of the highest quality electrical coils heretofore known.

The composite insulation embodying the invention is prepared from a particular fibrous material such, for example, as paper and mica flakes, and is applied to members without any resinous binder whatever. It has been found that amyl naphthalene, benzene, toluene, xylene, ethyl lactate, butyl alcohol or higher alcohols, naptha and other volatile organic liquids or mixtures thereof may be applied to mica flakes carried by the fibrous backing, to function as a temporary adhesive whereby the whole may be cut into tape, wrapped, or otherwise applied to conductors without shredding or falling apart. It is believed that the surface tension and wetting properties of these volatile organic liquids produce the adhesive effect.

One mode of practicing the invention is as follows: A sheet of paper or cloth wetted with a volatile organic liquid as described herein is covered with mica flakes, either by hand or by deposition from a mica laying machine. An organic liquid such as hydrocarbon solvent or an alcohol, the liquids preferably having less than 30% water, is then sprinkled or sprayed or brushed over the composite sheet so prepared. Finally a top sheet is applied over the mica flakes. The prepared sheet so wetted with the organic liquid may be rolled up or cut into a predetermined width tape before rolling and the rolls placed in closed containers carrying a small amount of the organic liquid.

When required for use, the roll of composite insulation is removed in a wet or damp condition from the container and immediately wrapped about a coil. The wetted mica flakes and sheet backing will stay together remarkably well without significant loss in strength. Nonpolar solvents in particular do not greatly diminish the strength of paper. No significantly greater difficulty is encountered in wrapping a coil with the solvent wetted tape than would be encountered in employing a similar tape bonded with a conventional resinous binder, such as asphalt. We prefer to call the tape so produced a "bondless" tape.

Soon after the "bondless" composite insulation has been applied to a coil, a major proportion of the solvent will have evaporated. Final traces of solvent, water and other volatile material will be readily removed during the conventional evacuation process applied to coils prior to varnish impregnation.

Composite insulation suitable for the practice of this invention may also be prepared with a depolymerizable and readily evaporable resin, such as polystyrene, polyisobutylene, cumarone-indene resins and the like, with or without volatile plasticizers, applied as a binder for the mica flakes and the fibrous backing material. The depolymerizable resin bonded composite insulation may be wrapped on conductors in the same manner as conventional composite tape and the taped coil subjected to temperatures of from 200° C. to 300° C., for example, to cause the resin first to depolymerize and then to evaporate. A vacuum applied to the coil during the heat treatment will ensure the removal of substantially all the resin from the composite insulation. It will be appreciated that inorganic fibrous materials are preferable to paper where temperatures greatly exceeding 200° C. are required for such treatment.

In a further modification, the composite insulation may be prepared with an asphaltic or other nonhardening binder soluble in some solvent and by subjecting the insulation to such solvent after it has been applied to a coil the binder is removed therefrom. A solvent extractor system operating on the Soxhlet principle, in which the solvent with dissolved asphalt or the like is withdrawn at intervals from about the coil into a boiler, and pure solvent vapors given off by the boiler are condensed and reapplied to the coil continually, will ensure a satisfactory removal of the binder from the composite insulation.

It has been found that the "bondless" tapes involving the combination of the easily volatile organic solvent such as toluene or butyl alcohol with the mica flakes and fibrous sheet backing is convenient and economical and gives the best results of any of the several modifications described herein. Accordingly this modification is preferred. The use of resinous binders in the composite insulation involves extra steps and time for removal.

A coil prepared with composite insulation treated in any one of the ways indicated above to eliminate any binder will be particularly suitable for varnish impregnation, since it will contain no resinous binder in the composite insulation tending to prevent evacuation of air and hindering the penetration of a resinous impregnant into the innermost portions of the coil. It has been found that, when vacuum is applied to coils wrapped with resin bonded composite mica tape, the air bubbles in the tape and coil simply expand slightly in volume against the resistance imposed by the binder but are not removed. Such trapped air bubbles have been found to be one of the prime causes of corona occurring when high voltage gradients are set up in a varnish impregnated coil. Power factor tests of coils constructed according to the present invention likewise will not show the changes in power factor with changes in voltage as occurs when air bubbles have been trapped in coils built with resin bonded composite tape. Other advantages are also gained by elimination of the resinous binder from the composite insulation of mica flakes and a fibrous sheet backing.

Referring to the figure of the drawing, there is illustrated a coil constructed according to the present invention. The coil is composed of a plurality of conductor turns 10 provided with turn insulation. If each conductor turn 10 is a single wire, bar or strap of copper, the insulation thereon may be composed of a wire enamel alone, or in combination with a wrapping of cotton, glass fabric, asbestos or the like, or other insulation. Conductors wrapped with untreated glass fibers or other fibers are suitable for use in the process. In some cases, each of the turns 10 may be composed of a group of several conductors assembled as a unit. In such case, the individual turn units may be wrapped with the composite insulation herein described.

The assembled turns of the coil are wrapped with a plurality of layers of composite tape 12, 14 and 16, each layer of tape being shown as butted, though half lapped tape is equally satisfactory. Obviously any number of layers of composite tape may be applied as desired. For example, a coil was prepared with sixteen separate layers of a composite insulation composed of three mil paper carrying five mils of mica. The thickness of the composite insulation will depend on the required dielectric strength and other factors. As shown, the composite insulation is composed of a fibrous sheet 18 and a plurality of mica flakes 20. In most cases the fibrous sheet backing is present on both sides of the layer of mica flakes though only one sheet of the backing 18 may be employed in some instances.

In order to impart better abrasion resistance to the coil, it is frequently customary to wrap a tape 22 of glass fiber fabric, cotton cloth or other tough fibrous material. The tape 22 may be wrapped after the coil with tapes 12, 14 and 16 has been treated to remove the binder such as asphalt, or previous to a treatment to remove any binder.

If the binding medium for the composite insulation of mica flakes and a fibrous sheet backing is one of the organic liquids as toluene, alcohol or the like, no treatment other than the conventional evacuation previous to varnish impregnation is necessary. However, a vacuum treatment is preferred in any event.

In order to attain the best electrical properties, it is desirable to employ a completely polymerizable liquid impregnant for impregnating the coil prepared as described.

Numerous liquid compositions of this type commonly known as "solventless" varnishes are available. For the purpose of the invention, it has been found that solutions of maleic acid esters or other alkyd resins dissolved in monostyrene or other polymerizable vinyl compound give excellent results when applied to the coil. A typical liquid resin composition of this kind suitable for impregnation was prepared as follows:

|  | Parts |
|---|---|
| Propylene glycol | 76 |
| Succinic acid | 112 |
| Maleic anhydride | 4.9 |

(all parts by weight) were reacted for 16 hours at temperatures of from 180° C. to 230° C. 60 parts by weight of the alkyd resin so prepared were dissolved in 40 parts by weight of monostyrene with 0.5 part by weight of benzoyl peroxide added as a catalyst. This composition was quite fluid and penetrated the coil readily. The coil after being evacuated in an enclosed chamber was treated with the liquid resin composition so prepared and pressure applied to force into the coil. After the coil was completely impregnated, it was removed from the enclosed chamber and heated at a temperature of 130° C. for 30 minutes. The resin polymerized substantially completely and no voids were found in the coil after cutting and examining it.

The following table is an indication of the degree of impregnation and of the improvement over the prior art practice:

*Power factor v. voltage stress at 28° C.*

| Voltage Stress | Coil A Standard Process: Resin Bonded Tape Volatile Solvent Varnish | Coil B Impregnation of Bondless Tape with Solventless Varnish |
|---|---|---|
| 2 kv | 1.3 | 5.90 |
| 8 kv | 13.0 | 5.68 |
| 16 kv | 16.0 | 5.70 |

In the table the 2 kv. test measures essentially the power factor of the resin alone. The resins employed in coil A happen to have a lower power factor than those in coil B. Other solventless resins have been applied and have given power factors of the order of 1%.

When tested for dielectric strength, coil A in the above table, held 32 kilovolts but broke at 35 kilovolts giving a dielectric strength of 192 volts per mil of insulation. Coil B under the same test held 45 kilovolts and broke at 49 kilovolts, giving a dielectric strength of 310 volts per mil held. Other tests have repeatedly confirmed these results.

Other solventless resins may be employed in a similar manner in practicing the process described above. Solutions of monostyrene alone, or carrying a small proportion of polystyrene to control viscosity may be employed in some cases. Likewise chlorinated monostyrene carrying a proportion of the polymer in order to secure predetermined viscosity may be employed as an impregnant. In some cases, mixtures of gums or tung oil and a drying oil and a drier as described in Goff Patent 1,848,344 may be applied to the coil by such treatment.

It has been found that by applying a solventless composition to a coil having composite insulation of the invention, one impregnation is fully sufficient to fill all the interstices and pores of the coil. Not only is good mechanical strength attained, but the best dielectric strength and unusual power factor characteristics are secured from the coils. Moisture absorption is negligible in coils so prepared. Furthermore, corona and other adverse phenomena are not encountered even when voltages of the order of 4000 volts and higher are applied to the coils. Therefore, the highest voltage electrical equipment may be prepared with members treated as described herein.

Obviously, not only rotating machine coils such as field coils, stator coils and the like, but magnetic coils for relays, transformers and the like may be produced in a similar manner. Wherever composite insulation composed of mica flakes and a fibrous sheet backing followed by a varnish impregnation is employed, the present invention presents many desirable and unusual advantages.

While the composite insulation described herein is particularly described with reference to mica flakes, numerous flake-like materials employed as a substitute or the equivalent of mica flakes may be treated to produce composite insulation as described. For example, films of treated bentonite, vermiculite or the like may be applied to a sheet backing and employed as detailed herein.

Since certain changes in carrying out the above processes and certain modifications in the compositions which embody the invention may be made without departing from its scope, it is intended that all matter contained in the above description or shown in the accompanying drawing shall be interpreted as illustrative and not in a limiting sense.

We claim as our invention:

1. The process of preparing an electrical coil capable of use at voltages of the order of 4000 volts and higher without adverse corona or other effects, comprising, in combination, winding an insulated conductor into a coil, wrapping the assembled turns of the coil with composite insulation composed of a sheet fibrous material and mica flake insulating material bonded together with a volatile adhesive medium, evaporating the adhesive medium to facilitate the penetration of a subsequently applied resinous material through the composite insulation, the treated composite insulation being loose and unpressed, evacuating air and other volatile material from the coil, applying to the evacuated coil a substantially completely polymerizable liquid resinous material to fill the pores and interstices therein, and polymerizing the liquid resinous material into a solid impregnant substantially completely filling the coil spaces.

2. The process of preparing an electrical coil capable of use at voltages of the order of 4000 volts and higher without adverse corona or other effects, comprising, in combination, winding an insulated conductor into a coil, wrapping the assembled turns of the coil with composite insulation composed of a sheet fibrous material and mica flake insulating material bonded together with a volatilizable adhesive medium, applying a reinforcing fabric tape about the applied composite insulation, heating the wrapped coil to evaporate the adhesive medium to facilitate the penetration of a subsequently applied resinous material through the composite insulation, the treated composite insulation being loose and unpressed, evacuating air and other volatile materials from the coil, applying to the evacuated coil a substantially completely polymerizable liquid resinous material to fill the holes and interstices therein, and polymerizing the liquid resinous material into a solid impregnant substantially completely filling the coil spaces.

3. The process of preparing an electrical coil capable of use at voltages of the order of 4000 volts and higher without adverse corona or other effects, comprising, winding a coil from a conductor carrying insulation, wrapping the assembled turns of the coil with composite insulation composed of a cellulosic sheet fibrous material and mica flake insulation, the components of the composite insulation being temporarily bonded by a readily volatile organic liquid binder selected from the group consisting of hydrocarbons and butanol and higher alcohols, subjecting the wrapped coil to evacuation to remove air, organic liquid binder and other vaporizable material therefrom, applying a substantially completely polymerizable liquid material to the evacuated coil to fill the pores and interstices in the coil and polymerizing the liquid material into a solid impregnant.

4. The process of preparing an electrical coil capable of use at voltages of the order of 4000 volts and higher without adverse corona or other effects, comprising, winding a coil from a conductor carrying insulation, wrapping the assembled turns of the coil with composite insulation composed of a sheet fibrous material and flake insulation, the components of the composite insulation being temporarily bonded by a readily volatile organic liquid binder, wrapping a reinforcing glass fabric tape over the applied composite insulation, subjecting the wrapped coil to evacuation to remove air, organic liquid binder and other vaporizable material therefrom, the treated composite insulation being loose and unpressed, applying a substantially completely polymerizable liquid material to the evacuated coil to fill the pores and interstices in the coil and polymerizing the liquid material into a solid impregnant.

5. The process of preparing an electrical coil capable of use at voltages of the order of 4000 volts and higher without adverse corona or other effects, comprising, in combination, winding an insulated conductor into a coil, wrapping the assembled turns of the coil with composite insulation composed of sheet fibrous material and mica flakes bonded together with an evaporable depolymerizing resin binder, applying a reinforcing glass fabric tape over the applied composite insulation, heat-treating the coil at a temperature sufficient to depolymerize and cause evaporation of the binder from the composite insulation, subjecting the coil to evacuation to remove air and other vaporizable material therefrom, applying to the evacuated coil a substantially completely polymerizable liquid resinous material to fill the pores and interstices thereof and polymerizing the liquid resinous material into a solid impregnant substantially completely filling the coil spaces.

LAWRENCE R. HILL.
ERNEST BINDSCHADLER.
JOHN A. CAMPBELL.

REFERENCES CITED

The following references are of record in the file of this patent:

UNITED STATES PATENTS

| Number | Name | Date |
| --- | --- | --- |
| 691,871 | Raphael | Jan. 28, 1902 |
| 830,419 | Downes | Sept. 4, 1906 |
| 1,303,511 | Shackelton | May 13, 1919 |
| 1,529,973 | Underhill | Mar. 17, 1925 |
| 1,848,344 | Goff | Mar. 8, 1932 |
| 1,874,723 | Dawson | Aug. 30, 1932 |
| 1,900,710 | Hertner | Mar. 7, 1933 |
| 1,918,586 | Blood | July 18, 1933 |
| 2,320,866 | Hill | June 1, 1943 |
| 2,363,324 | Hill | Nov. 21, 1944 |
| 2,405,576 | Heyman | Aug. 13, 1946 |